United States Patent
McNeal

[11] 3,748,510
[45] July 24, 1973

[54] DYNAMOELECTRIC MACHINE WINDING CONNECTION INSULATOR

[75] Inventor: Walter P. McNeal, Holland, Mich.

[73] Assignee: General Electric Company, Fort Wayne, Ind.

[22] Filed: Oct. 26, 1971

[21] Appl. No.: 192,204

[52] U.S. Cl. .............................. 310/71, 310/68 C
[51] Int. Cl. ........................................... H02k 11/00
[58] Field of Search ..................... 310/71, 68, 68 C, 310/45, 85; 339/221, 276; 336/192

[56] References Cited
UNITED STATES PATENTS

| | | | |
|---|---|---|---|
| 3,219,857 | 11/1965 | Fisher | 310/71 |
| 3,523,273 | 9/1970 | Hammel | 339/276 |
| 2,872,599 | 2/1959 | DeYoung | 310/71 |
| 2,169,097 | 8/1939 | Hall | 310/45 |
| 3,457,442 | 7/1969 | Charlton | 310/71 |
| 3,014,140 | 12/1961 | Tupper | 310/71 |
| 3,304,447 | 2/1967 | Lindt | 310/71 |

Primary Examiner—R. Skudy
Attorney—Joseph B. Forman, John M. Stoudt et al.

[57] ABSTRACT

Coils of electric motor phase windings on a core have end turns extending beyond core end faces and have protected and electrically isolated interpole and/or external lead connections. The isolation and protection is provided by an insulator having at least one substantially enclosed receptacle open only at one or both ends thereof. Insulators in one form include a first connection receptacle wall portion formed from a single thickness of material; a second connection receptacle wall portion of a double thickness of material; and means for positively anchoring the insulator in a desired position relative to the winding end turns. In a preferred illustrated form, the connection insulator may include receptacles for receiving two separate winding connections that are to be insulated from each other, and includes an insulation barrier between the two receptacles.

10 Claims, 6 Drawing Figures

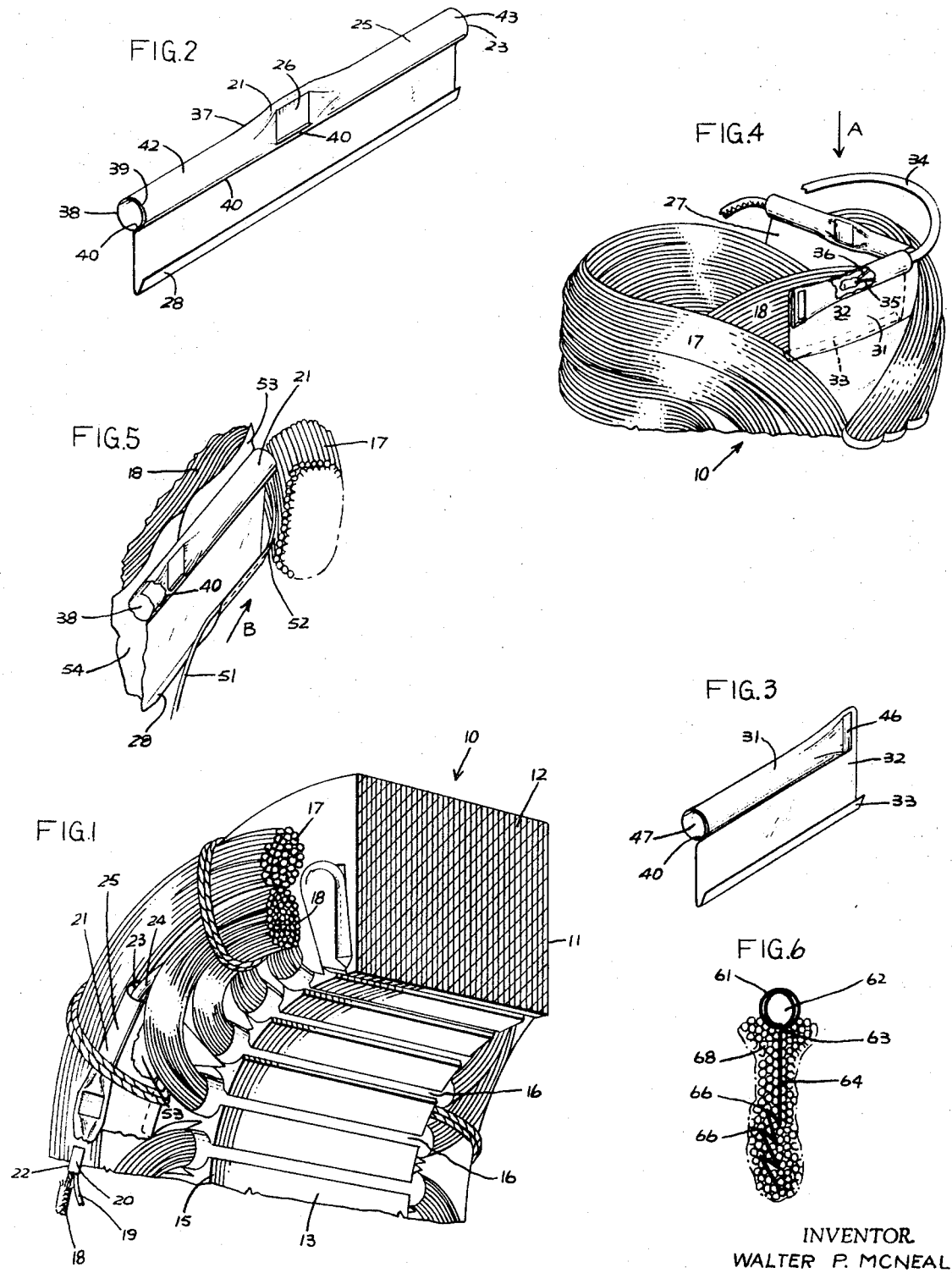

DYNAMOELECTRIC MACHINE WINDING CONNECTION INSULATOR

BACKGROUND OF THE INVENTION

This invention relates generally to connection insulators suitable for use in dynamoelectric machines, and more particularly to an improved winding connection insulator arrangement for dynamoelectric machine stators.

In alternating current dynamoelectric machines, such as single phase or multi-phase induction morors, a number of phase windings are carried by a magnetic material stator core. Each of the winding phases are normally formed of coils of suitable insulated conductors with the coils defining circumferentially spaced apart poles. Conventionally, the terminal ends of the windings are electrically connected to the bare ends of insulated or covered external lead wires by "crimp" type connections or by twisting and then brazing the wire ends together. These procedures have also been followed to interconnect the ends of the coils of a given phase and thus form what is known in the art as an interpole connection.

In order to electrically insulate the above described connections from the windings as well as other motor parts, one practice has been to furnish a sleeve type insulator as disclosed for example in Hall et al. U. S. Pat. No. 2,169,097, entitled "DYNAMO-ELECTRIC MACHINE." Still another approach has been to utilize a generally U-shaped insulator as taught, inter alia, in Fisher U. S. Pat. No. 3,219,857, entitled "CONNECTION INSULATORS FOR DYNAMO-ELECTRIC MACHINE WINDINGS." The disclosures of both of the above identified patents are specifically incorporated herein by reference.

It would, however, be advantageous and desirable to provide a connection insulator that would be even more effective in withstanding (even during winding pressing operations) pressures exerted thereon by relatively sharp corners or edges of a winding connection insulated thereby; that may be achored to a winding even more securely than heretofore; that would permit more economical utilization of material than heretofore; or that would provide the benefits of combinations of these desirable features. Moreover, it would be desirable to provide a substantially closed tubular or sleeve shaped insulator so as to prevent the inadvertent movement of a segment of winding into a connection accommodating receptacle thereof; and yet avoid rupturing the insulator as a result of compression of the insulator about an over-sized connection, while also providing means for reliably anchoring the insulator within a bundle of winding end turns so as to prevent withdrawal of such connection from the insulator receptacle.

SUMMARY OF THE INVENTION

Consequently, it is a general object of the present invention to provide an improved stator arrangement for dynamoelectric machines, including one or more connection insulators which provide the desirable features and benefits mentioned above.

It is a more specific object of the present invention to provide an improved stator having an electrical insulator for covering, isolating, and protecting winding connections which is simple in construction, is economical from a standpoint of material utilization, and can be both readily positioned between winding end turns and firmly anchored in place once assembled.

It is another object of the present invention to provide an improved electrical insulator arrangement that may be used both for interpole and external winding lead connections of an electric motor stator and which facilitates assembly and installation of the insulator with winding end turns.

In carrying out the objects of the present invention in one form, I provide a stator for use in an electric motor in which phase windings are arranged on the core, each winding being formed of poles defined by coils having end turns extending beyond the side or end faces of the core. These coils may have interpole connections, as well as connections between terminal ends of coils and the bare ends of external lead wires. Each connection is electrically isolated and may be protected by a substantially enclosed connection receiving insulator receptacle open at one or both ends thereof. Insulators in one preferred form include a first recetpacle wall portion formed from a single thickness of material; a second receptacle wall portion of a double thickness of material; and means for positively anchoring the insulator in a desired position relative to the winding end turns.

After a winding connection is established, the connection is axially inserted into a generally tubular shaped receptacle portion of the insulator. Prior thereto or thereafter, the anchoring portion of the insulator may be assembled with the winding end turns by moving the anchoring means into the end turn bundle.

In a preferred illustrated form, the connection insulator may include receptacles for receiving two separate winding connections that are to be insulated from each other, and includes an insulation barrier between the two receptacles.

The subject matter which I regard as my invention is particularly pointed out and distinctly claimed in the concluding portion of this specification. My invention, itself, however, together with further objects and advantages thereof may best be understood by reference to the following description taken in connection with the accompanying drawing.

BRIEF DESCRIPTION OF THE DRAWING

FIG. 1 illustrates an embodiment of the invention in a preferred form, and is a view in perspective partially broken away to show detail, of a portion of a stator assembly after it has been fabricated, with connection insulators installed and winding end turns compacted and tied;

FIG. 2 is a view in perspective of one preferred form of an improved connection insulator shown in FIG. 1;

FIG. 3 is a view, in perspective, of another preferred form of improved connection insulator that also may be utilized with the core assembly of FIG. 1;

FIG. 4 is a view in perspective, partially broken away, of the stator assembly of FIG. 1 prior to compaction and tying of the winding end turns thereof, this FIGURE also showing the relative placement of the connection insulators of FIGS. 2 and 3 relative to the winding end turns;

FIG. 5 is a view, with parts removed and parts broken away, that illustrates the interrelationships of connection insulators embodying the invention and winding end turns during and after placement of such insulators; and FIG. 6 is an end elevation, with parts removed and parts broken away, of another connection insulator embodying the invention.

DESCRIPTION OF THE PREFERRED EMBODIMENTS

With reference now to the drawing and the exemplifications of my invention as illustrated therein, there is shown a stator assembly 10 of the type employed in alternating current single phase induction motors. The stator assembly includes a core 11 conventionally fabricated from a presleected number of substantially identical laminations 12 suitably punched out of relatively thin magnetic sheet material. The laminations are retained in stacked, juxtaposed relation in the usual way, e.g , by welding transversely across the stack periphery or by co-operating grooves and keys as will be understood. Moreover, the laminations may be held together by an interlaminate bonding material, also as will be understood.

The core 11 includes angularly spaced apart and aligned teeth 13, which terminate at a rotor receiving bore 15 and define a number of spaced apart winding accommodating slots 16 therebetween. These slots accommodate windings, generally indicated by the numerals 17 and 18 in the drawing, of different phases.

For different applications and different motor designs, the first and second winding phases may be of other types than as will be now described, therefore, it will be understood that the above a-d following description is for purposes of exemplification only. With this in mind, the first illustrated winding 17 is a main or running winding for a resistance start induction motor and the winding 18 is an auxiliary, e.g., starting winding for the motor.

Still having reference to FIG. 1, a plurality of external lead wires are provided for connecting the energization windings of the assembly 10 to an external power source and one such external lead wire has been shown, with parts broken away, at 18. Connected to this lead wire are one or more winding lead wires 19 which are the lead wire portions of the energization windings. The connection 22 has been formed with a mechanical crimp type connection 20, but it will be understood that a connection may also be made by welding, brazing, or soldering. Moreover, while only a single winding lead 19 is revealed in FIG. 1 as being connected to external lead wire 18, more than one winding lead may be connected to an external lead wire.

While part of the connection insulator 21 has been broken away in FIG. 1 for clarity, the unbroken insulator per se is shown in FIG. 2. Thus, the connection 22 of FIG. 1 is actually disposed within a connection receiving receptacle portion of the insulator 21 and would be hidden from view in FIG. 1 if the insulator 21 had not been broken away. For completeness of description it should also be noted that the connection receiving portion 25 of the insulator 21 includes a receptacle, open at 23, that receives a connection between still another external lead wire 24 and one or more other winding lead wires.

As will be understood more clearly by reference to FIG. 2 the connection receiving portion or receptacles of the insulator 21 are closed by means shown as a collapsed wall section 26. Thus, a single insulator may include a pair of electrically isolated receptacles for receiving two different winding connections. Moreover, the insulator 21 includes anchoring means in the form of a depending leg 27 and an anchoring lip or hook 28.

With reference now to FIG. 4, the assembly 10 has been shown with the end turn portions of the windings in an unpressed or uncompacted condition and prior to placement of winding retaining means such as laces therearound. Also revealed is the insulator 21 and an insulator 31 having a single connection receptacle. It will be appreciated from FIG. 3 that the insulator 31 is also provided with anchoring means in the form of a depending leg 32 and an anchoring lip or hook 33 that cooperates with one or more of the end turn portions or segments of the winding 18. Parts of the insulator 31 have been broken away to reveal a brazed and soldered connection 35 between the conductive portion of an external lead wire 34 and the uninsulated end 36 of one of the energization windings of the assembly 10.

With continuing reference to FIGS. 2 and 3, the insulators 21 and 31 and one method by which they may be fabricated will be described in more detail. It is noted, however, that the following description is for purposes of exemplification and that the insulators could be made from a choice of different materials and also could be molded rather than be formed from strips of sheet material as will now be described.

I have found it to be both advantageous and economical to form the insulators 21 and 31 from a strip of insulating material, preferably plastic film, such as polyethylene terephthalate, one commercially available form of which is available under the trade name "MYLAR" from E. I. du Pont de Nemours & Co., Inc. The thickness of the material selected will depend upon both the dielectric and structural characteristics of the sheet material as well as the maximum voltage to be applied to a given stator core assembly. For example, when the material is "MYLAR" film and the stator core 10 is to be energized by 110 volts, I have found that sheet material having a thickness of 5 mils is more than adequate.

Initailly, a length of strip material of selected thickness is rolled to form a tubular portion of an insulator such as the tubular portion 37 of the insulator 21 and then severed. During formation of this tubular portion, part of the tube, such as the part 38, may be formed with a single thickness of the material whereas a different part, such as part 39, will be formed with a double thickness for a purpose to be described hereinafter. The portion 37 of the insulator is then permanently established as a tubular segment by adhesively securing or ultrasonically welding the overlapping portions of the tube generally along the portion 40 thereof. Anchoring means are formed from the same starting piece of strip material and include the depending leg portion 27 and at least one portion extending from the plane thereof, e.g., an anchoring hook or lip 28. In order to provide two electrically insulated receptacles in the insulator 21, a portion of the tubular section of the insulator is collapsed and the walls thereof secured together, again by adhesive means, heat, or ultrasonic welding as shown at 26.

At the completion of this step, two receptacles 42, 43 each open at one end thereof will have been formed in the insulator 21. When an insulator embodying the invention is to include only a single connection receptacle, the insulator 21 may be severed through the closed portion 26 thereof or, alternatively, the insulator 31 of FIG. 3 may be used.

In the case of insulator 31, a sealed portion 46 defines a closed end of the connection receiving receptacle 47. It should be emphasized at this point that, particularly in the case of the insulator 31, it may be desirable to omit the closed portion 46 of the insulator so that the receptacle 47 will be open at both ends thereof.

During assembly of theinsulators 21 and 31 with the stator core assembly 10, the anchoring portion of the insulators may be pushed downwardly into end turns of the windings 17 and 18 in the relative derection of arrow A as viewed in FIG. 4. Alternatively, as schematically indicated by FIG. 5 the insulators may be fed tangentially into the winding end turns in the relative direction indicated by arrow B.

In either case, it is desirable for the anchoring lip or hook 28 (or lip 33 of insulator 31) to engage and be anchored by at least one segment of the wire in the end turn portion of one of the energization windings. What is believed to be the locking interrelationship between a portion of a wire segment 51 and an uncinate member such as the lip 28 of the insulator 21 is revealed. When the insulator 21 is tangentially inserted into the winding generally in the direction of arrow B as shown in FIG. 5, the leading edge 52 of the lip 28 is believed to work its way under a portion of the winding segment 51.

Then, with subsequent movement of the insulator, the lip 28 is secured and held under the wire segment 51. During this insertion process, the body of insulator 21 also tends to move down against the winding, apparently because the lip 28 and segment 51 coact to provide a comming action.

With reference now to FIG. 4, it is believed that as the insulator 21 is assembled by insertion generally in the direction of the arrow A, the lip 51 is compressed against the leg 27 as it moves downward along adjacent winding segments and, upon subsequent slight movement in a direction opposite to the direction of arrow A, the anchoring lip acts as a barb and becomes anchored under a segment of wire.

The connection insulators 21, 31 may be positioned relative to winding end turns as taught herein during different stages of manufacture of a stator core assemlby. It is preferred, however, for eaxe of assembly and ease of using the insulators in existing assembly procedures, to assemble the insulators with the winding end turns substantially immediately after lead wire connections have been made and placed in the insulator receptacles. This could be done prior to final compaction and forming of the end turns of windings 17 and 18.

In the case of the stator core assembly 10, phase insulation (also known as "window" insulation) has been positioned between the end turns of windings 17 and 18. A portion of such insulation, with other parts broken away, has been shown at 53 in FIG. 1. Two pieces of this insulation also may be viewed at 53 and 54 in FIG. 5.

Thus, in the case of the structure shown in FIGS. 1 and 5, phase insulation will provide a layer of insulation between connections contained within the insulator 21 and the winding end turns 18. Accordingly, with the wall 38 of the insulator 21 positioned against a face of the insulator 53 or 54, a double layer of positive insulation between winding end turn segments adjacent thereto and connections will be provided. Accordingly, the wall 38 of the connection insulator 21 and phase insulation 53 or 54 will form one double insulating region while the double wall portion 39 of the insulator 21 will provide a second double insulating region. It will at this time be recognized that insulators 21 and 31 could have double walls completely around the receptacle portions thereof to provide double insulation layers even when phase insulation was not to be adjacent thereto.

Moreover, since the generally tubular receptacle portions of the insulator 21 are sealed at 40, it is virtually impossible for a segment of a winding end turn to enter the receptacle even when the insulator is assembled adjacent to the winding end turns by the insertion process described in connection with FIG. 5.

Prior to or after anchoring the insulators relative to a winding segment, connections may be placed in the receptacles of the insulators, Again, since the receptacle portions of the insulators have been previously established by being sealed along the regions 40 thereof, any attempt to insert an oversized connection into a receptacle will be readily apparent to an operator. In such an event, an operator may use any suitable means to reduce the size of the connection prior to placing the connection in an insulator receptacle.

Thus, insulators embodying the invention are of use in avoiding a situation where an oversized connection is placed within an open receptacle that may subsequently be ruptured when it is pressed against such connection during subsequent winding pressing or lacing operations. It should also be noted that compaction and/or lacing of the winding end turns result in a more compact end turn mass and further insure a substantially permanent anchoring of the insulators 21 or 31 relative to the end turns of windings 17, 18.

Turning now to FIG. 6, there is illustrated a connection insulator 61 embodying the invention in another form. In this form, the insulator 61 is provided with a double wall of insulation completely around a receptacle portion 62. The receptacle portion is sealed, e.g., by ultrasonic welding along the region 63, so as to ingibit inadvertent entry of a winding segment into the receptacle portion of the insulator. The insulator 61 also includes an anchoring leg 64 having a plurality of anchoring hooks or barbs 66 formed thereon. These barbs further insure anchoring of the insulator relative to winding turn segments collectively indicated by the reference numeral 68. In addition, theis arrangement shows that a single hook member may be formed between the tubular portion of an insulator and the free end of a leg depending therefrom.

It will be appreciated from the foregoing that the present invention provides an improved connection insulator for dynamoelectric machine windings which is simple of construction, easily installed over a connection, and which can afford an increased measure of reliability. In addition, the insulator may be more firmly anchored in place than prior insulators, while utilizing a minimum amount of insulating material in the fabrication thereof and yet providing, when desired, double layers of positive insulation between a connection and winding turn segments.

Accordingly, while in accordance with the Patent Statutes I have described what at present is considered to be the preferred dmbodiment of my invention, it will be obvious to those skilled in the art that numerous changes and modifications may be made therein without departing from the invention. It is, therefore, aimed

What I claim as new and desire to secure by Letters Patent of the United States is:

1. An inductive assembly including a magnetic core for use in an electrical inductive device; at least one winding comprised of wire conductors arranged on the magnetic core with winding turn portions projecting beyond at least one face of the core, at least one end of said winding including a winding lead wire; at least one external lead wire; means for electrically connecting a portion of the winding lead wire and a portion of the external lead wire; and a body of electrical insulation accommodating said means for electrically connecting; said body of electrical insulation including a first part for receiving at least the electrically connected portions of the winding lead wire and external lead wire, and anchoring means for holding said first part in a predetermined relationship relative to said winding turn portions; said anchoring means including at least one leg extending from said first part and along the winding turn portions, and at least one uncinate portion disposed adjacent to the winding turn portions and locked with at least one segment of wire conductor to thereby resist movement of the b ody of insulation relative to said at least one winding.

2. The structure of claim 1 wherein the means for anchoring includes a plurality of uncinate portions disposed adjacent to the winding turn portions.

3. The structure of claim 1 wherein the first part of the body of insulation comprises a receptacle having at least one substantially continuous peripheral wall separating the connected portions of the winding and external lead wires, and wherein inadvertent movement of a winding turn portion into the receptacle is inhibited by the peripheral wall of the receptacle.

4. The structure of claim 3 wherein the receptacle includes a collapsed wall section that substantially closes one end of the receptacle.

5. The structure of claim 3 wherein the body of insulation includes at least two electrically isolated connection receiving receptacles.

6. The structure of claim 3 wherein the peripheral wall is formed of a layer of sheet material and the receptacle includes a second layer of sheet material disposed along at least a portion of the peripheral wall to thereby provide a double layer of insulation along said at least a portion of the peripheral wall.

7. The structure of claim 6 further comprising a second winding having winding turn portions disposed adacent to the winding turn portions of said at least one winding; a second body of insulation disposed between the winding turn portions of said at least one winding and said second winding; and wherein the at least one leg is positioned between the second body of insulation and the winding turn portions of a selected one of the windings with said double layer of insulation and said uncinate portion being positioned adjacent to the winding turn portions of said selected one of the windings.

8. A stator for use in a dynamoelectric machine comprising a magnetic core; at least one winding arranged on said core including a number of wire coils having end turns projecting beyond at least one face of the core; connection means electrically joining at least one terminal end of said winding to the end of at least one wire conductor; and an electrical insulator accommodating said connection means; said insulator comprising an elongate tubular member having a continuous peripheral wall that defines a receptacle having at least one open end; said insulator further including a leg extending along a plurality of said end turns, with the peripheral wall of the tubular member forming a barrier against movement of an end turn segment along said leg into the elongate receptacle.

9. A stator for use in an electric motor comprising a magnetic core; a plurality of phase winding arranged on said core to form a plurality of poles having coils composed of wire conductors, said coils having end turns projecting beyond at least one face of the core, with at least some of the end turns of one phase winding closely adjacent to at least some of the end turns of the another phase winding; connection means electrically joining at least one lead wire to an end of at least one of said phase windings; at least one eleongate insulator formed from one sheet of electrically insulating material accommodating the at least one connection means; said one sheet of electrically insulating material having first and second spaced apart portions thereof secured together at a seam exnding along said elongate insulator, said elongate insulator including at least first and second receptacles separated from one another by third and fourth secured together portions of the one sheet of electrically insulating materail.

10. The structure of claim 9 wherein the insulator includes a depending leg anchored against end turns of at least one of the phase windings.

* * * * *

UNITED STATES PATENT OFFICE
CERTIFICATE OF CORRECTION

Patent No. 3,748,510      Dated July 24, 1973

Inventor(s) Walter P. McNeal

It is certified that error appears in the above-identified patent and that said Letters Patent are hereby corrected as shown below:

In column 1, line 11, change "morors" to --motors--.

In column 1, line 41, change "achored" to --anchored--.

In column 2, line 20, change "recetpacle" to --receptacle--.

In column 3, line 12, change "presleected" to --preselected--.

In column 3, line 30, change "a-d" to --and--.

In column 4, line 40, change "Initailly" to --Initially--.

In column 5, line 8, change "theinsulators" to --the insulators--.

In column 5, line 11, change "derection" to --direction--.

In column 5, line 32, change "comming" to --camming--.

In column 5, line 44, change "semlby" to --sembly--.

In column 5, line 44, change "eaxe" to --ease--.

In column 5, line 49, change "could" to --would--.

In column 6, line 40, change "ingibit" to --inhibit--.

In column 6, line 47, change "theis" to --this--.

In column 6, line 64, change "dmbodiment" to --embodiment--.

In column 7, line 26, change "b ody" to --body--.

In column 8, line 36, change "eleongate" to --elongate--.

UNITED STATES PATENT OFFICE
CERTIFICATE OF CORRECTION

Patent No. 3,748,510  Dated July 24, 1973

Inventor(s) Walter P. McNeal

It is certified that error appears in the above-identified patent and that said Letters Patent are hereby corrected as shown below:

In column 8, line 41, change "exnding" to --extending--.

In column 8, line 45, change "materail" to --material--.

Signed and sealed this 9th day of July 1974.

(SEAL)
Attest:

McCOY M. GIBSON, JR.
Attesting Officer

C. MARSHALL DANN
Commissioner of Patents